(12) United States Patent
Nam

(10) Patent No.: US 11,068,283 B2
(45) Date of Patent: Jul. 20, 2021

(54) SEMICONDUCTOR APPARATUS, OPERATION METHOD THEREOF, AND STACKED MEMORY APPARATUS HAVING THE SAME

(71) Applicant: SK hynix Inc., Icheon (KR)

(72) Inventor: Ji Hoon Nam, Icheon (KR)

(73) Assignee: SK hynix Inc., Icheon (KR)

( * ) Notice: Subject to any disclaimer, the term of this patent is extended or adjusted under 35 U.S.C. 154(b) by 290 days.

(21) Appl. No.: 16/270,450

(22) Filed: Feb. 7, 2019

(65) Prior Publication Data

US 2020/0004557 A1    Jan. 2, 2020

(30) Foreign Application Priority Data

Jun. 27, 2018    (KR) .................. 10-2018-0073874

(51) Int. Cl.
*G06F 9/44* (2018.01)
*G06F 12/02* (2006.01)
*G06F 9/448* (2018.01)

(52) U.S. Cl.
CPC ........ *G06F 9/4494* (2018.02); *G06F 12/0238* (2013.01); *G06F 2212/251* (2013.01)

(58) Field of Classification Search
CPC ................................ G06F 9/4494; G06F 12/02
See application file for complete search history.

(56) References Cited

U.S. PATENT DOCUMENTS

| | | | | |
|---|---|---|---|---|
| 5,293,620 A * | 3/1994 | Barabash | .............. | G06F 9/4881 718/102 |
| 7,133,978 B1 * | 11/2006 | James-Roxby | ......... | G06F 9/526 711/152 |
| 2006/0085604 A1 * | 4/2006 | Guthrie | ................. | G06F 9/3851 711/141 |
| 2008/0163183 A1 * | 7/2008 | Li | ........................... | G06F 8/456 717/149 |
| 2012/0079501 A1 * | 3/2012 | Sandstrom | ............ | G06F 9/5066 718/105 |
| 2013/0024875 A1 * | 1/2013 | Wang | ...................... | G06F 13/22 719/318 |
| 2015/0205648 A1 * | 7/2015 | Takada | ................ | G06F 11/3409 712/208 |
| 2015/0269054 A1 * | 9/2015 | Kothamasu | ......... | G06F 11/3476 714/45 |
| 2015/0309751 A1 * | 10/2015 | Ellis | ....................... | G06F 1/329 711/154 |
| 2016/0291878 A1 * | 10/2016 | Kang | ...................... | G06F 3/061 |
| 2019/0004862 A1 * | 1/2019 | Bernat | .................... | G06F 9/505 |
| 2020/0264936 A1 * | 8/2020 | Gurram | ................. | G06F 9/5066 |

FOREIGN PATENT DOCUMENTS

KR    101030385 B1    4/2011

* cited by examiner

*Primary Examiner* — Phil K Nguyen

(57) ABSTRACT

A semiconductor apparatus may include a storage device including a data area and a code area and storing program codes provided from a host device in the code area, a plurality of unit processors, each of the plurality of unit processors including an internal memory, and a main control component configured to receive an operation policy, which includes a processor ID, a code ID, and a code address, from the host device and to control the plurality of unit processors based on the operation policy. The processor ID is an identifier for each of the plurality of unit processors, the code ID is an identifier for each of the program codes, and the code address indicates a position of the code area where each of the program codes is stored.

17 Claims, 5 Drawing Sheets

FIG.4

| Operation Policy | | | |
|---|---|---|---|
| OPTION Number | PROCESSOR ID | CODE ID | address information (ADD_start, ADD_end) |

FIG.5

| OPTION no. | PROCESSOR ID | CODE ID | address information |
|---|---|---|---|
| 0 | $P_0 \sim P_{127}$ | 0 | ADD_S0 ~ ADD_E0 |
|   | $P_{128} \sim P_{192}$ | 1 | ADD_S1 ~ ADD_E1 |
|   | $P_{193} \sim P_{255}$ | 2 | ADD_S2 ~ ADD_E2 |
| 1 | $P_0 \sim P_{255}$ | 0 | ADD_S0 ~ ADD_E0 |
| 2 | $P_0 \sim P_{255}$ | 1 | ADD_S1 ~ ADD_E1 |
| 3 | $P_0 \sim P_{255}$ | 2 | ADD_S2 ~ ADD_E2 |

FIG.6

| CODE | DATA SIZE | EXPECTED OPERATION TIME (µs) | ENTIRE OPERATION TIME (ms) | NUMBER OF ALLOCATED PROCESSORS |
|---|---|---|---|---|
| 0 | 1000 | 2 | 2 | 167 |
| 1 | 2000 | 0.5 | 1 | 83 |
| 2 | 3000 | 1 | 3 | 250 |

SEMICONDUCTOR APPARATUS, OPERATION METHOD THEREOF, AND STACKED MEMORY APPARATUS HAVING THE SAME

CROSS-REFERENCE TO RELATED APPLICATION

The present application claims priority under 35 U.S.C. § 119(a) to Korean application number 10-2018-0073874, filed on Jun. 27, 2018, in the Korean Intellectual Property Office, which is incorporated herein by reference in its entirety.

BACKGROUND

1. Technical Field

Various embodiments generally relate to a semiconductor apparatus, and, more particularly, to a semiconductor apparatus, an operation method thereof, and a stacked memory apparatus having the same.

2. Related Art

As an ultra high speed network is constructed and high specification hardware such as a high pixel camera and a high quality display device is developed, a high performance computing apparatus becomes more desirable. In addition, higher specification hardware is gradually installed in mobile electronic apparatuses each having a limited physical space.

When the mobile electronic apparatuses provide services of playing movies, music, games, and the like, because power consumption is relatively large, a high performance and low power consumption processor is desirable in order to provide high quality content.

In the electronic apparatuses, an amount of data exchanged between a processor and a memory apparatus may be increased.

The memory apparatus aims at inputting and outputting a large amount of data with low power consumption and the processor aims at processing a large number of operations at a short time.

A semiconductor apparatus, into which a processor and a memory are integrated may process a large amount of data at a high speed.

SUMMARY

In an embodiment, a semiconductor apparatus may include: a storage device including a data area and a code area and storing program codes provided from a host device in the code area; a plurality of unit processors, each of the plurality of unit processors including an internal memory, respectively; and a main control component configured to receive an operation policy, which includes a processor ID, a code ID and a code address, from the host device and to control the plurality of unit processors based on the operation policy, and wherein the processor ID is identifier for each of the plurality of unit processors, the code ID is identifier for each of the program codes and the code address indicates a position of the code area where each of the program codes.

In an embodiment, an operation method of a semiconductor apparatus, which include a storage device and a controller, the storage device including a data area and a code area and storing program codes provided from a host device in the code area, the controller including a plurality of unit processors, each of the plurality of unit processors including an internal memory, respectively, the operation method comprising: receiving, by the controller, an operation policy which includes a processor ID, a code ID and a code address, from the host device, wherein the processor ID is identifier for each of the plurality of unit processors, the code ID is identifier for each of the program codes and the code address indicates a position of the code area where each of the program codes; and controlling, by the controller, the plurality of unit processors based on the operation policy.

In an embodiment, a stacked memory apparatus, which is include a base die; and a plurality of core dies disposed over the base die and stacked through a plurality of through electrodes, wherein at least one of the plurality of core dies comprises a storage device, the storage device including a data area and a code area and storing program codes provided from a host device in the code area, and wherein the base die comprises: a plurality of unit processors, each of the plurality of unit processors including an internal memory, respectively; and a main control component configured to receive an operation policy, which includes a processor ID, a code ID and a code address, from the host device and to control the plurality of unit processors based on the operation policy, and wherein the processor ID is identifier for each of the plurality of unit processors, the code ID is identifier for each of the program codes and the code address indicates a position of the code area where each of the program codes.

BRIEF DESCRIPTION OF THE DRAWINGS

FIG. 4 illustrates operation policy in accordance with an embodiment.

FIG. 5 illustrates a s operation policy for the option numbers in accordance with an embodiment.

FIG. 6 illustrates an example of allocating unit processors based on amounts of processing load of respective program codes in accordance with an embodiment.

DETAILED DESCRIPTION

Hereinafter, a semiconductor apparatus, an operation method thereof, and a stacked memory apparatus having the same will be described below with reference to the accompanying drawings through various embodiments.

Figure 1:
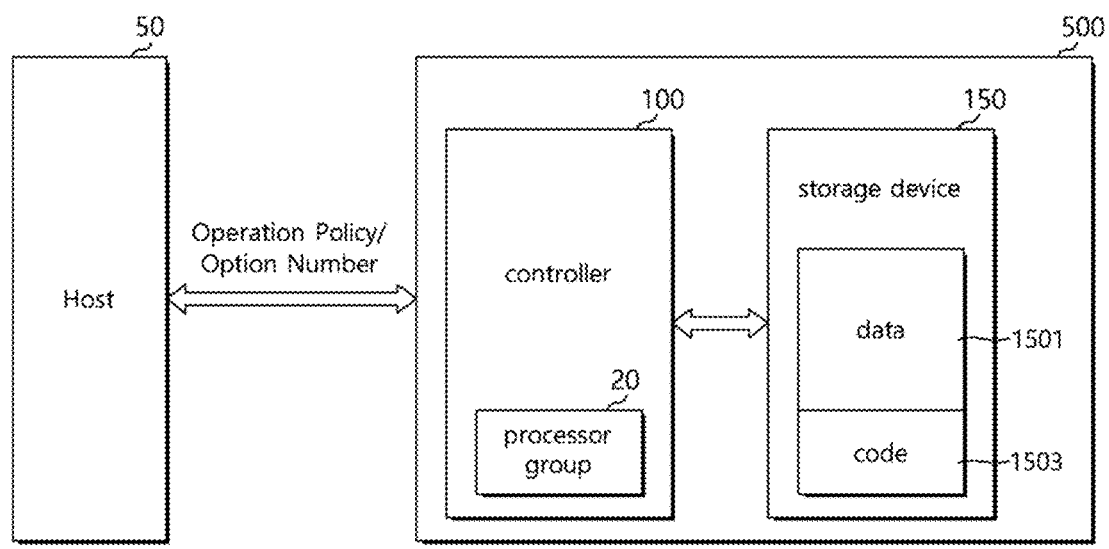
FIG. 1 illustrates a computing system in accordance with an embodiment.

FIG. 1 is a configuration diagram of a computing system 10 in accordance with an embodiment.

Referring to FIG. 1, the computing system 10 may include a host device 50 and semiconductor apparatus 500. The semiconductor apparatus 500 may include a controller 100 and a storage device 150.

The controller 100 may control the storage device 150 in response to a request of a host device 50. For example, when the host device 50 provides a program command (or a write command), an access address, and data to the controller 100, the controller 100 may program the data in the storage device 150. In response to a read command and an access address of the host device 50, the controller 100 may read data from the storage device 150 and output the read data to the host device 50.

In an embodiment, the controller 100 may include a processor group 20 including a plurality of unit processors.

Each of the processors in the processor group 20 may include an internal memory subordinate to the processor. For example, each of the processors in the processor group 20 may be coupled to an internal memory and control the internal memory. Each of the processors in the processor group 20 may be configured to fetch, decode, and execute a program code existing in the internal memory and to store an execution result.

The storage device 150 is configured to receive a command and an address from a memory controller, access an area corresponding to the received address, and execute a corresponding command. The command, for example, may include a write command, a read command, and the like.

The storage device 150 may include a volatile memory device, a nonvolatile memory device, or both. In an embodiment, the storage device 150 may include any one of a volatile memory device such as a dynamic random access memory (DRAM), a nonvolatile memory device (e.g., a NAND flash memory, a NOR flash memory, a phase-change RAM (PRAM), a resistive RAM (ReRAM), a ferroelectric RAM (FRAM), and a spin torque transfer magnetic RAM (STT-MRAM)), and a hybrid type of the volatile memory device and the nonvolatile memory device. However, embodiments of the present disclosure are not limited thereto.

In an embodiment, the storage device 150 may be divided into a data area 1501 and a code area 1503. The code area 1503 of the storage device 150 may store at least one program code. The program code may include a boot code or an application execution code capable of executing various applications. The data area 1501 may be an area for storing data. The size or allocation ratio of each of the data area 1501 and the code area 1503 may be determined and changed according to a type or characteristics of the host device 50 coupled to the semiconductor apparatus 500.

A device that causes at least one program code to be stored in the code area 1503 of the storage device 150 may be a host device 50, a computing device of a manufacturing company of the storage device 150, or a computing device of a manufacturing company of the semiconductor apparatus 500. However, embodiments of the present disclosure are not limited thereto. In order to store at least one program code in the code area 1503, it is possible to use a serial communication interface such as a ROM writer and a joint test action group (JTAG), an interface such as a background debug mode (BDM), a network interface, and the like. However, embodiments of the present disclosure are not limited thereto.

The host device 50 may set, store and manage an operation policy of the at least one program code stored in the code area 1503. The operation policy of the program code is a schedule of which program code is to be processed (executed) by each of the plurality of processors included in the processor group 20. In an embodiment, the operation policy may include an option number, a processor ID, a code ID, and an address information as shown in FIG. 4, and may be indicated by one or more option numbers (e.g., option numbers 0, 1, 2, and 3 in FIG. 5). For example, the processor ID may be an identifier for a unit processor, the code ID may indicate a program code to be executed by the unit processor. The address information may indicate a storage position (e.g., a code address of the program code stored in the code area 1503) and may include a start address ADD_start and an end address ADD_end. The host device 50 and the controller 100 may mutually enact in advance such that the operation policy includes the option number, the processor ID, the code ID, and the code address, and that the option number may represent a specific combination of the processor ID, the code ID, and the code address.

The host device 50 may provide the controller 100 of the semiconductor apparatus 500 with the operation policy including all of the contents (e.g., the option number, the processor ID, the code ID, and the code address) or may provide only a selected option number to replace the operation policy, when the semiconductor apparatus 500 is booted or in operation.

The semiconductor apparatus 500 may operates according to and operation policy provided in booting process. In order to change the operation policy when the semiconductor apparatus 500 is in operation, the host device 50 may transmit an interrupt signal to the semiconductor apparatus 500 to suspend the operation of the semiconductor apparatus 500 and then transmit the operation policy to be changed.

Each processor may store a program code fetched from the code area 1503 in an internal memory thereof, and decode and execute the stored program code according to the operation policy.

Because at least one program code is stored in the storage device 150, the semiconductor apparatus 500 may not have a separate storage space (e.g., a RAM or a ROM) for storing the program code. Normally, because a code storage memory storing a boot code in a conventional semiconductor apparatus has a relatively small storage capacity, storing program codes other than the boot code may be limited. In embodiments of the present disclosure, because the storage device 150 has a relatively high storage capacity, a boot code as well as other program codes may be stored in the storage device 150. Furthermore, one or more program codes may be copied to a processor, and the copied program codes may be executed under the control of the controller 100. Various embodiments in which program codes are copied to a processor and are executed may be possible, and some of these embodiments will be described below in more detail.

Figure 2:
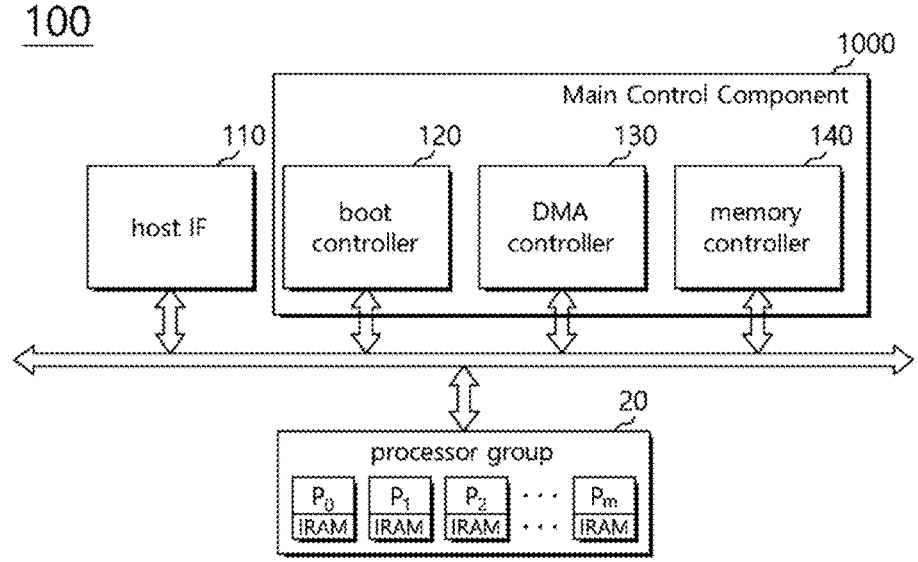
FIG. 2 illustrates a controller in accordance with an embodiment.

FIG. 2 is a configuration diagram of a controller 100 in accordance with an embodiment.

Referring to FIG. 2, the controller 100 in accordance with an embodiment may include a processor group 20, a host interface (IF) 110 and a main control component 1000.

In an embodiment, the processor group 20 may include a plurality of unit processors $P_0$ to $P_m$. Each of the unit processors $P_0$ to $P_m$ may include an internal memory (IRAM). The unit processors $P_0$ to $P_m$ may be configured to execute program codes identical to one another or different from one another in a sequential manner or a parallel manner. One or more of the plurality of unit processors $P_0$ to $P_m$ may include an application processor. The application processor may be a processor configured to be able to execute various applications.

In an embodiment, a host device 50 may determine a type and an execution scheme (i.e., operation policy) of program codes for the plurality of unit processors $P_0$ to $P_m$ constituting the processor group 20. However, embodiments of the present disclosure are not limited thereto.

In an embodiment, the host device 50 may perform scheduling such that the plurality of unit processors $P_0$ to $P_m$ execute one or more common program codes in a sequential manner or a parallel manner. In an embodiment, the host device 50 may perform scheduling such that the plurality of processors $P_0$ to $P_m$ are grouped into a given number (e.g., an integer equal to or greater than 2) of a plurality of processor parts, and the plurality of processor parts execute respective program codes that are different from one another in a sequential manner or a parallel manner. Each unit processor included in a processor part may execute one or more common program codes in a sequential manner or a parallel manner.

When establishing an operation policy for allocating program codes to be executed by each of the plurality of processors $P_0$ to $P_m$, the host device 50 may consider weights based on processing load amounts according to program codes. That is, a required processing time of each of a plurality of program codes executable by the processor group 20 may be different according to the amount of data to be processed. Accordingly, the host device 50 may determine how many unit processors execute a program code according to a weight and the total number of the unit processors $P_0$ to $P_m$. In an embodiment, the weight is obtained based on an entire processing time (or an entire operation time) for the program code. For example, as will be described below in more detail with reference to FIG. 6, the host device 50 may allocate program codes to respective processor parts, each of which includes a given number of unit processors that is obtained by multiplying a corresponding weight with the total number of the unit processors $P_0$ to $P_m$.

The operation policy including the option number, the processor ID, code ID and code address and/or only the option number may be changed according to a host device 50's requirement or a user's request.

The host IF 110 may receive a control signal, a command, and a clock signal from the host device 50 and provide a communication channel for controlling data input/output. Particularly, the host IF 110 may provide a physical connection between the host device and the semiconductor apparatus 500. That is, the host IF 110 may provide interfacing with the semiconductor apparatus 500 in correspondence to a bus format of the host device 50. The bus format of the host device 50 may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and a universal flash storage (UFS).

The main control component 1000 may configured to control a booting operation of each of the unit processors $P_0$ to $P_m$ in the processor group 20, transfer data (e.g., a program code stored in the storage device 150) to a corresponding unit processor in the processor group 20, and electrically connects the storage device 150 to the processor group 20.

In an embodiment, the main control component 1000 in accordance with an embodiment may include a boot controller 120, a direct memory access (DMA) controller 130, and a memory controller 140.

The boot controller 120 may be configured to control a booting operation of each of the unit processors $P_0$ to $P_m$ in the processor group 20 when the semiconductor apparatus 500 is powered on.

Booting the unit processors $P_0$ to $P_m$ may refer to a procedure in which an operating system (OS) installed in the semiconductor apparatus 500 is prepared to control one or more elements of the semiconductor apparatus 500.

The booting procedure may include processor initialization, inspection, diagnosis, and initialization of an external device (e.g., the storage device 150 of FIG. 1), a process for copying a boot code to an internal memory of each of the unit processors $P_0$ to $P_m$ and starting an OS, and the like.

The boot controller 120 may cause each of the unit processors $P_0$ to $P_m$ in the processor group 20 to be in a reset state during the booting process. In the reset state of each of the unit processors $P_0$ to $P_m$, when the operation policy and/or the option number are transmitted from the host device 50, the boot controller 120 may transmit a code address as an address information on program codes scheduled according to the unit processors $P_0$ to $P_m$. In an embodiment, the operation policy may be transmitted to the boot controller 120 when power is supplied, and as long as the operation policy is not changed, only the option number may be transmitted to the boot controller 120 when power is supplied. In a case where the operation policy is changed when power is supplied or in an operation, a changed operation policy is transmitted to the boot controller 120 from the host device 50. For example, after the host device 50 transmits a signal indicating a first operation policy (e.g., an operation policy for the option numbers shown in FIG. 5) to the boot controller 120 and the boot controller 120 stores the first operation policy, when all the contents of the first operation policy remain the same, only a signal indicating the option number (e.g., one of option numbers 0, 1, 2, and 3 shown in FIG. 5) may be transmitted to the boot controller 120. When at least a portion of the first operation policy stored in the boot controller 120 is changed, the host device 50 transmits a signal indicating a second operation policy that is different from the first operation policy to the boot controller 120.

The DMA controller 130 supports data transfer from one storage position to another storage position quickly and automatically.

In an embodiment, when the DMA controller 130 receives an instruction from each of the unit processors $P_0$ to $P_m$ to transfer a program code stored in a specific area of the storage device 150 to a corresponding internal memory IRAM, the DMA controller 130 may write the transferred program code in the corresponding internal memory IRAM of each of the unit processors $P_0$ to $P_m$, and notify each of the unit processors $P_0$ to $P_m$ that the program code has been completely written.

Accordingly, each processor may execute the program code stored in its own internal memory IRAM.

The memory controller 140 electrically connects the storage device 150 to the processor group 20 in order to control the storage device 150 under the control of the host device 50 or independently of the host device 50.

In an embodiment, the memory controller 140 may control the storage device 150 to program and read data according to a request of the host device 50. To this end, the memory controller 140 may provide a command and an address to the storage device 150, and transmit/receive data to/from the storage device 150.

In another embodiment, the memory controller 140 may generate a command, an address, and data by itself regardless of a request of the host device, and control the storage device 150.

The memory controller 140 may execute firmware (FW) for controlling the storage device 150.

The elements 20, 110, 120, 130, and 140 constituting the controller 100 of a semiconductor apparatus (e.g., the semiconductor apparatus 500 of FIG. 1) according to embodiments of the present disclosure may be installed on a single substrate or may be packaged into a single chip.

In an embodiment, the operation policy and/or the option number may be changed using the host device 50 according to an operation or a use purpose of the semiconductor apparatus 500, and the changed operation policy and/or option number may be easily applied when the host device 50 transmits the operation policy and/or the option number to the boot controller 120 during the boot process of the semiconductor apparatus 500.

When a conventional semiconductor apparatus has stored program codes in a code storage memory having a relatively small storage capacity and then new program codes replace with the previously stored program codes, the conventional apparatus may be turned off, the previously stored program codes may be deleted, the new program codes may be stored, and then the conventional apparatus may be rebooted. In addition, these processes may be repeated whenever program codes are changed.

However, as described in the present disclosure, when a plurality of program codes are stored in the storage device 150 having a relatively large capacity and a program code operation policy and at least one option number are set in advance, a plurality of processors may copy program codes allocated to their own internal memories IRAMs and execute the copied program codes according to the operation policy and the option number. When the operation policy, the option number, or both are changed, it is possible to simply and easily change program codes to be executed in the processors.

Figure 3:
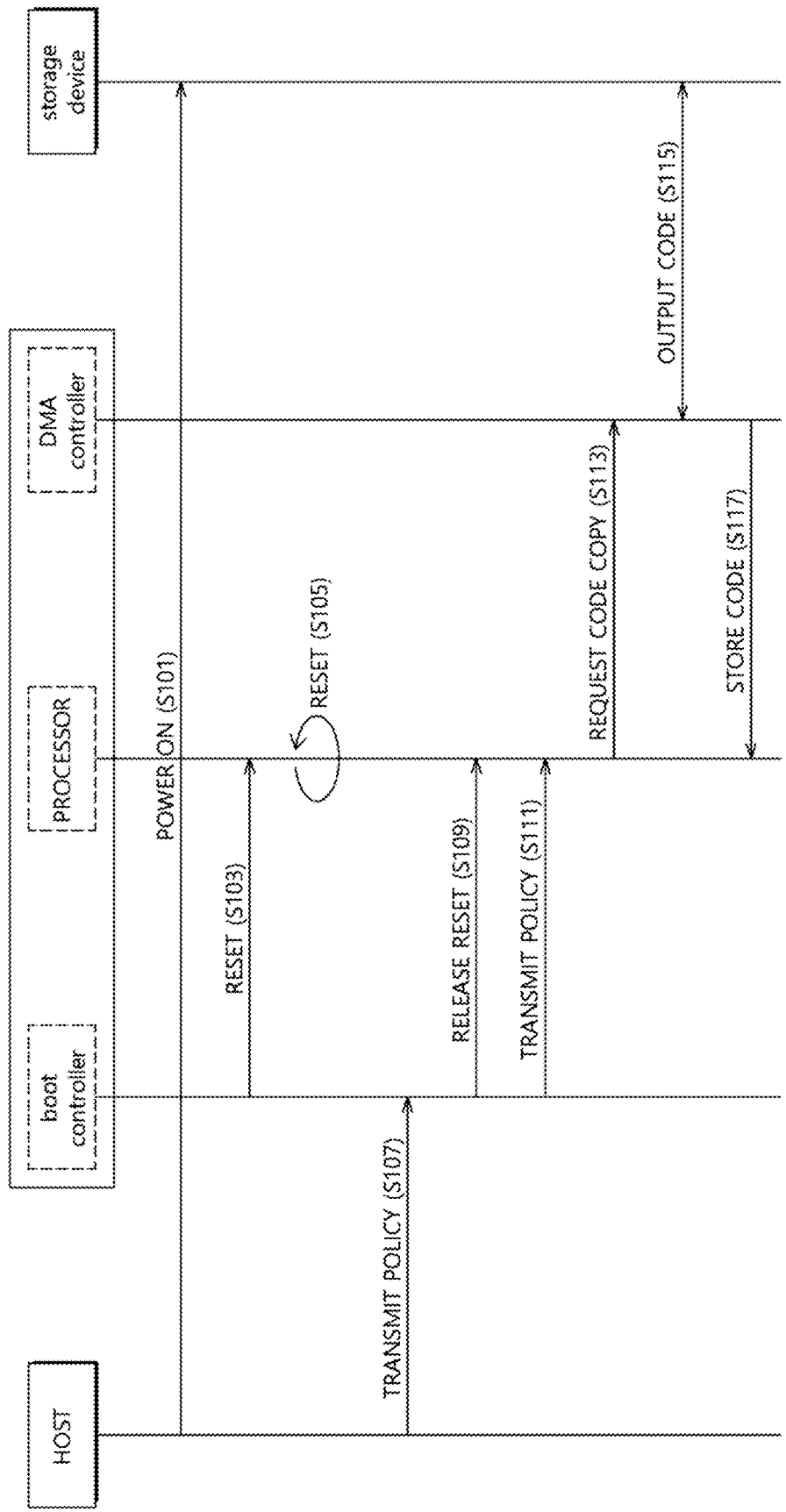
FIG. 3 illustrates an operation of a semiconductor apparatus in accordance with an embodiment.

FIG. 3 illustrates an operation method of a semiconductor apparatus (e.g., the semiconductor apparatus 500 in FIG. 1) in accordance with an embodiment.

In embodiments of the present disclosure, a process for storing at least program code in a code area (e.g., the code area 1503 in FIG. 1) of a storage device (e.g., the storage device 150 in FIG. 1) and a process for setting, by a host device 50, an operation policy of program codes may be performed in advance.

In order to store at least program code in the code area 1503, it is possible to use a serial communication interface such as a ROM writer and a joint test action group (JTAG), an interface such as a background debug mode (BDM) and a network interface. However, embodiments of the present disclosure are not limited thereto. A device that stores at least one program code in the code area 1503 may be the host device 50, a computing device of a manufacturing company of the storage device 150, or a computing device of a manufacturing company of the semiconductor apparatus 500. However, embodiments of the present disclosure are not limited thereto.

The host device 50 may set in advance an operation policy for at least one program code stored in the code area 1503.

FIG. 4 illustrates operation policy in accordance with an embodiment.

Referring to FIG. 4, the operation policy may include an option number, a processor ID, a code ID, and the address information (code address). For example, the processor ID may indicates an identifier of each unit processor, the code ID may indicates a program code to be executed by the unit processor, and the address information indicates a start address ADD_start and an end address ADD_end of the program code stored in the code area 1503. The option number represent a specific combination of the processor ID, the code ID and the code address.

For example, an information on which one or more unit processors execute a program code and an information on a storage position (e.g., the start address ADD_start and the end address ADD_end) of the corresponding program code in the code area 1503 may be set according to a corresponding one of option number.

In an embodiment, the host device 50 may perform scheduling such that the plurality of unit processors $P_0$ to $P_m$ execute one or more common program codes. In an embodiment, the host device 50 may perform scheduling such that the plurality of processors $P_0$ to $P_m$ are grouped into a given number of a plurality of processor parts, and the plurality of processor parts execute respective program codes that are different from one another.

FIG. 5 illustrates an operation policy for the option numbers in accordance with an embodiment.

Referring to FIG. 5, first, second, and third program codes (or code 0, code 1, and code 2), which respectively correspond to code IDs 0, 1, and 2, may be stored in a storage device (e.g., the storage device 150 in FIG. 1) and a number of unit processors $P_0$ to $P_{255}$ is 256.

A host device 50 may schedule an operation policy as illustrated in FIG. 5. The operation policy or selected option number only may be transmitted to a boot controller (e.g., the boot controller 120 in FIG. 2) in a booting process.

Referring to FIG. 5, when the operation policy corresponds to a first option number 0, the host device 50 may perform scheduling such that the code 0 is executed by a first plurality of unit processors $P_0$ to $P_{127}$ (or a first processor part), the code 1 is executed by a second plurality of unit processors $P_{128}$ to $P_{192}$ (or a second processor part), and the code 2 is executed by a third plurality of unit processors $P_{193}$ to $P_{255}$ (or a third processor part). When the operation policy corresponds to of a second option number 1, all the unit processors $P_0$ to $P_{255}$ may execute the code 0. When the operation policy corresponds to a third option number 2, all the processors $P_0$ to $P_{255}$ may execute the code 1. When the operation policy corresponds to a fourth option number 3, all the processors $P_0$ to $P_{255}$ may execute the code 2.

Respective code address (indicated by corresponding start addresses and end addresses) of the code 0, code 1, and code 2 may be included in the operation policy and transmitted to the boot controller 120.

Accordingly, when the operation policy as illustrated in FIG. 5 is transmitted to the boot controller 120 for storage and the option number is transmitted to the boot controller 120 at a time of booting, the boot controller 120 may provide one or more code addresses (e.g., ADD_S0~ADD_E0, ADD_S1~ADD_E1, and ADD_S2~ADD_E2) where one or more program codes (e.g., code 0, code 1, and code 2) corresponding to the option number (e.g., the first option number 0) are stored.

FIG. 6 illustrates an example of allocating unit processors based on amounts of processing load (or processing load amounts) of respective program codes in accordance with an embodiment.

It is assumed that first, second, and third program codes (or code 0, code 1, and code 2) may be stored in a storage device (e.g., the storage device 150 in FIG. 1) and a number of a plurality of unit processors $P_0$ to $P_{499}$ is 500.

A host device 50 may consider weights based on processing load amounts according to program codes in scheduling an operation policy that allocates program codes to be executed by each of the plurality of unit processors $P_0$ to $P_{499}$. For example, a processing time of each of a plurality of program codes executable by a processor group (e.g., the processor group 20 in FIG. 2) may be different according to an amount of data to be processed. Accordingly, the host device 50 may determine how many unit processors execute a program code according to a weight and the total number of unit processors $P_0$ to $P_{499}$. For example, the weight may be obtained based on an entire processing time (or an entire operation time) for the program code.

Referring to FIG. 6, regarding the code 0, because an amount (or a size) of data to be processed is 1,000 and a processing time for data having a unit size is 2 μs, an entire operation time required for processing the code 0 is 2 ms. Regarding the code 1, because an amount of data is 2,000 and a processing time for data having a unit size is 0.5 μs, an entire operation time is 1 ms. Regarding the code 2, because an amount of data is 3,000 and a processing time for data having a unit size is 1 μs, an entire operation time is 3 ms.

Accordingly, because weights for the codes 0, 1, and 2 may be respectively 2/6, 1/6, and 3/6 and the total number of processors is 500, 167 unit processors (or a fourth processor part), 83 unit processors (or a fifth processor part), and 250 unit processors (or a sixth processor part) may be respectively allocated to the codes 0, 1, and 2.

Referring back to FIG. 3, after the host device 50 set the operation policy for determining duplication or distribution of the program codes in the unit processors and a distribution method, as described above, the apparatus 10 may be powered on as illustrated in FIG. 3 at S101.

As the semiconductor apparatus 500 is powered on, a boot controller (e.g., the boot controller 120 in FIG. 2) may reset each of the unit processors $P_0$ to $P_m$ in the processor group 20 at S103, so that each of the unit processors $P_0$ to $P_m$ in the processor group 20 may wait in the reset state at S105.

While the unit processors $P_0$ to $P_m$ are in the reset state, the host device may transmit a previously set operation policy and first option number to the boot controller 120 at S107. For example, the host device 50 may transmit a signal indicating the previously set operation policy and a signal indicating the first option number to the boot controller 120. If the previous operation policy has already been transmitted at the time of power-on and all the contents of the previous operation policy have not been changed, the host device 50 may transmit only changed option number (e.g., the second option number) to the boot controller 120 at S107. For example, the host device may transmit only a signal indicating the second option number to the boot controller 120. The boot controller 120 may store the operation policy provided from the host device 50 in an internal register.

Then, the boot controller 120 may release the reset state of each of the unit processors $P_0$ to $P_m$ at S109. Subsequently, at S111, the boot controller 120 transmits a position (or an address) of the internal register in the boot controller 120, which is to be accessed by each of the unit processors $P_0$ to $P_m$, to each of the unit processors $P_0$ to $P_m$ on the basis of the option number received at S107. The register, which is to be accessed by each of the unit processors $P_0$ to $P_m$, may store code addresses of the program conde allocated to the unit processors $P_0$ to $P_m$.

Each of the unit processors $P_0$ to $P_m$ may fetch a code address from a corresponding area of the register, transmit the fetched a code address to the DMA controller 130, and instruct one or more program codes stored in a corresponding address area of the storage device 150 to be transferred to its own internal memory (e.g., the internal memory IRAM in FIG. 2) at S113.

The DMA controller 130 may access areas as instructed by the unit processors $P_0$ to $P_m$ to output stored program codes from the storage device 150 at S115 and store the program codes in internal memories IRAMs of the processors $P_0$ to $P_m$ at S117. Then, the DMA controller 130 may notify the processors $P_0$ to $P_m$ that the data transfer operation has been completed. In an embodiment, the processors $P_0$ to $P_m$ sequentially execute the program codes stored in the internal memories IRAMs.

In the case of changing one or more program codes to be executed by one or more of the unit processors $P_0$ to $P_m$, an operation policy or an option number may be changed. The changed operation policy or changed option number may be transferred and stored in the boot controller 120 in a booting process.

As described above, in embodiments of the present disclosure, a plurality of program codes may be stored in the storage device 150 and the boot controller 120 may be controlled according to a program code operation policy generated by the host device 50. The boot controller 120 may inform each processor of a program code storage area according to the operation policy provided from the host device 50, and each processor may copy a program code stored in a corresponding position of the storage device 150 to its own internal memory IRAM using the DMA controller 130 and execute the program code. Accordingly, a semiconductor apparatus (e.g., the semiconductor apparatus 500 in FIG. 1) according to an embodiment of the present disclosure may use some of the plurality of program codes stored in the storage device 150 as new program codes when the unit processors execute the new program codes.

Initially a plurality of program codes may be stored in the storage device 150, and the host device 50 simply changes an operation policy, so that program codes to be executed by unit processors may be simply changed. For example, in embodiments of the present disclosure, the host device 50 may simply change an operation policy to change allocation of program codes to respective processor parts, each of the processor parts including one or more unit processors that execute a corresponding one of the program codes.

Figure 7:
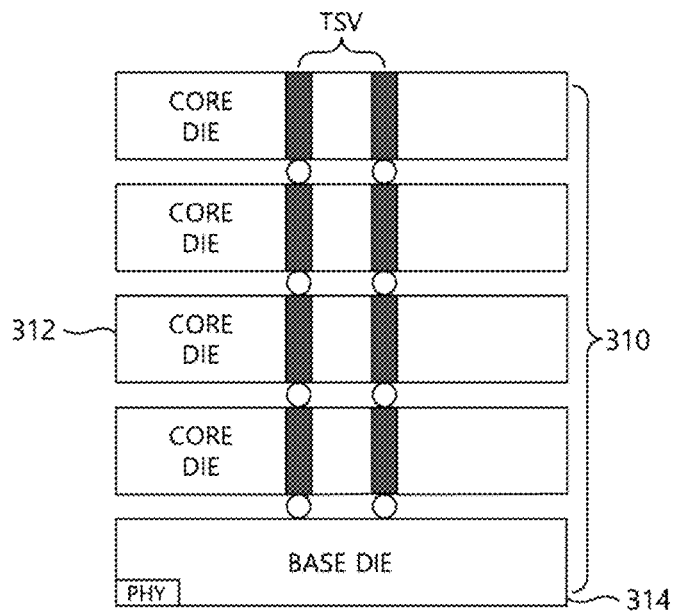
FIG. 7 illustrates a stacked memory apparatus in accordance with an embodiment.
Figure 8:
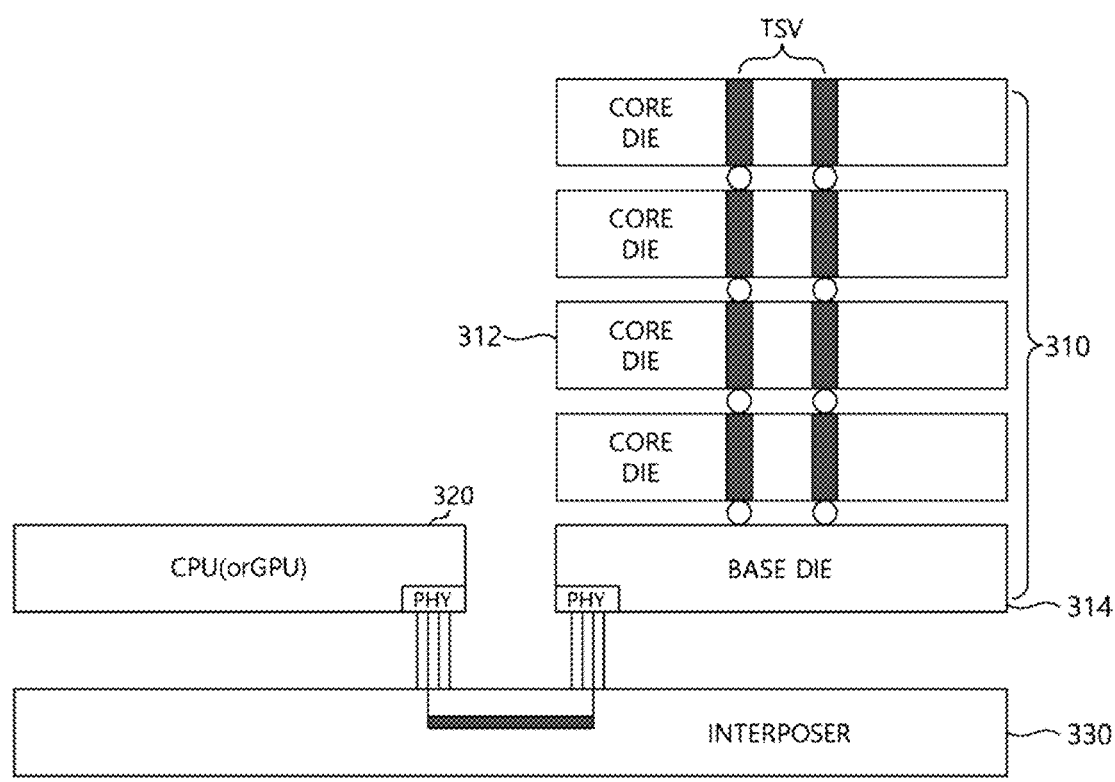
FIG. 8 illustrates a stacked memory apparatus including a memory controller and an interface substrate in accordance with an embodiment.
Figure 9:
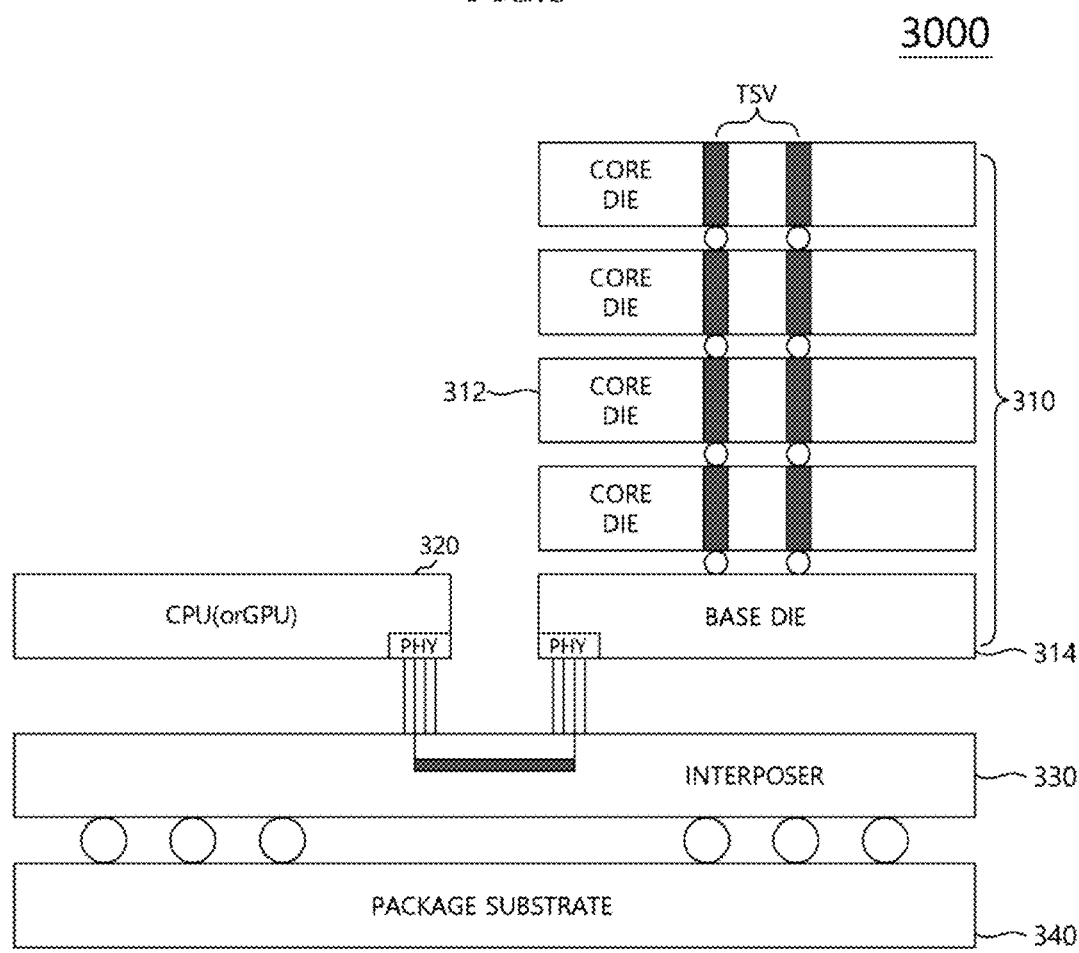
FIG. 9 illustrates a stacked memory apparatus including a package substrate in accordance with an embodiment.

FIG. 7, FIG. 8, and FIG. 9 illustrate respective stacked memory apparatuses 30, 300, and 3000 in accordance with embodiments.

FIG. 7 illustrates of a stacked memory apparatus 30 in accordance with an embodiment.

The stacked memory apparatus 30 may include a stacked structure 310 in which a plurality of dies are stacked. The stacked structure 310 may be configured in the form of a high bandwidth memory (HBM) in which the plurality of dies are stacked and electrically connected to one another through through-silicon vias (TSVs), so that the number of input/output units is increased and a bandwidth is increased.

The stacked structure 310 may include a base die 314 and a plurality of core dies 312.

The plurality of core dies 312 may be stacked over the base die 314 and electrically connected to one another through TSVs (or through electrodes). In each of the plurality of core dies 312, memory cells for storing data and circuits for core operations of the memory cells may be arranged. In an embodiment, at least one of the plurality of core dies 312 includes a storage device (e.g., the storage device 150 in FIG. 1), the storage device including a data area (e.g., the data area 1501 in FIG. 1) and a code area (e.g., the code area 1503 in FIG. 1).

The core dies 312 may be electrically connected to the base die 314 through the TSVs and may receive signals, power, and the like from the base die 314 through the TSVs.

The base die 314, for example, may include a controller (e.g., the controller 100 in FIG. 1 and FIG. 2). The base die 314 may perform various functions of the stacked memory apparatus 30, for example, a memory management function such as power management and refresh of the memory cells, a timing adjustment function between the core dies 312 and the controller 100, and the like.

A physical area (or a physical interface (PHY)) included in the base die 314 may be an input/output area of an address, a command, data, a control signal and the like. The PHY may include a predetermined number of input/output circuits capable of satisfying a data processing speed required for the stacked memory apparatus 30. The PHY of the rear surface of the base die 314 may include a plurality of input/output terminals and a power supply terminal such that signals for performing an input/output operation and power are supplied.

FIG. 8 illustrates a stacked memory apparatus 300 in accordance with an embodiment.

Referring to FIG. 8, the stacked memory apparatus 300 may include a stacked structure 310 of a plurality of core dies 312 and a base die 314, a memory controller 320, and an interface substrate 330.

In the base die 314, one or more circuits for providing an interface between the core dies 312 and the memory controller 320 may be installed. The stacked structure 310 in FIG. 8 may have a structure similar to that of the stacked structure 310 in FIG. 7.

A physical area (or a physical interface (PHY)) of the stacked structure 310 and a PHY of the memory controller 320 may be electrically connected to each other through the interface substrate 330. The interface substrate 330 may be called an interposer.

FIG. 9 illustrates a stacked memory apparatus 3000 in accordance with an embodiment.

The stacked memory apparatus 3000 in FIG. 9 is obtained by arranging the stacked memory apparatus 300 in FIG. 8 over a package substrate 340.

The package substrate 340 and an interface substrate 330 may be electrically connected to each other through one or more connection terminals.

A stacked structure 310 and a memory controller 320 are stacked over the interface substrate 330, thereby forming the stacked memory apparatus 300 in FIG. 8. The stacked memory apparatus 300 is mounted over the package substrate 340, and then the resulting structure is packaged, so that it is possible to implement a system in package (SiP) type semiconductor apparatus.

Figure 10:
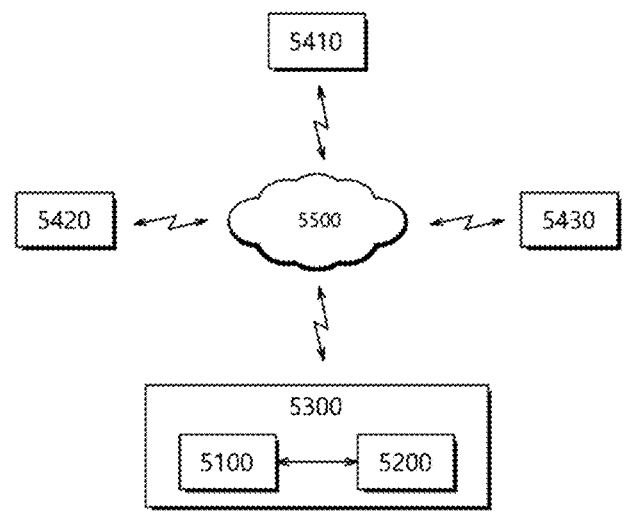
FIG. 10 illustrates a network system including a data storage device in accordance with an embodiment.

FIG. 10 illustrates a network system 5000 including a data storage device in accordance with an embodiment. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410, 5420, and 5430. For example, the server system 5300 may store the data provided from the plurality of client systems 5410 to 5430. For another example, the server system 5300 may provide data to the plurality of client systems 5410, 5420, and 5430.

The server system 5300 may include a host device 5100 and a memory system 5200. The memory system 5200 may be implemented using the semiconductor apparatus 500 shown in FIG. 1 to 2.

While various embodiments have been described above, it will be understood to those skilled in the art that the above-described embodiments are examples. Accordingly, a semiconductor apparatus, an operation method thereof, and a stacked memory apparatus having the same described herein should not be limited based on the above-described embodiments, and various modifications may be possible.

What is claimed is:

1. A semiconductor apparatus comprising:
 a storage device including a data area and a code area and storing program codes provided from a host device in the code area; and
 a controller including a plurality of unit processors, each of the plurality of unit processors including an internal memory; and
 wherein the controller is configured to receive an operation policy, which includes one or more of a processor ID, a code ID, a code address, and an option number, from the host device and to control the plurality of unit processors based on the operation policy,
 wherein the processor ID is an identifier for each of the plurality of unit processors, the code ID is an identifier for each of the program codes, the code address indicates a position of the code area where each of the program codes is stored, and the option number represents a specific combination of the processor ID, the code ID, and the code address, and
 wherein the controller is configured to receive the operation policy including only the option number when the operation policy is not changed, and receive the operation policy including the processor ID, the code ID, the code address, and the option number when the operation policy is changed, from the host device.

2. The semiconductor apparatus according to claim 1, wherein the controller is further configured to transfer the code address to the plurality of unit processors.

3. The semiconductor apparatus according to claim 1, wherein the controller is further configured to read the program codes from the storage device, and store the read program codes in the internal memories of the plurality of unit processors.

4. The semiconductor apparatus according to claim 1, wherein the operation policy is configured to cause the plurality of unit processors to commonly execute any one of the program codes, or cause each of a plurality of program codes to be distributed and executed in the plurality of unit processors.

5. The semiconductor apparatus according to claim 1, wherein the plurality of unit processors are grouped into a given number of processor parts, and
 wherein the operation policy is configured to cause each of the processor parts to execute a corresponding one of the program codes.

6. The semiconductor apparatus according to claim 1, wherein the controller is further configured to receive the operation policy from the host device when power is supplied to the semiconductor apparatus or the semiconductor apparatus is operating.

7. The semiconductor apparatus according to claim 1, wherein the plurality of unit processors are grouped into a given number of processor parts, and
 wherein the operation policy is configured to cause each of the processor parts to execute a corresponding one of the program codes according to a weight and a total number of the plurality of unit processors.

8. An operation method of a semiconductor apparatus including a storage device and a controller, the storage device including a data area and a code area and storing program codes provided from a host device in the code area, the controller including a plurality of unit processors, each of the plurality of unit processors including an internal memory, the operation method comprising:

receiving, by the controller, an operation policy which includes one or more of a processor ID, a code ID, a code address, and an option number, from the host device, wherein the processor ID is an identifier for each of the plurality of unit processors, the code ID is an identifier for each of the program codes, the code address indicates a position of the code area where each of the program codes is stored, and the option number represents a specific combination of the processor ID, the code ID, and the code address; and controlling, by the controller, the plurality of unit processors based on the operation policy, wherein the controller is configured to receive the operation policy including only the option number when the operation policy is not changed, and receive the operation policy including the processor ID, the code ID, the code address, and the option number when the operation policy is changed, from the host device.

9. The operation method of the semiconductor apparatus according to claim 8, wherein the operation policy or a signal indicating the option number is received when each of the plurality of unit processors is in a reset state in a booting process or the semiconductor apparatus is in an operation.

10. The operation method of the semiconductor apparatus according to claim 8, wherein controlling the plurality of unit processors comprises:

transferring, by the controller, the code addresses to the plurality of unit processors.

11. The operation method of the semiconductor apparatus according to claim 8, wherein controlling the plurality of unit processors comprises reading the program codes from the storage device, and storing the read program codes in the internal memories of the plurality of unit processors.

12. The operation method of the semiconductor apparatus according to claim 8, wherein the operation policy includes a policy for causing the plurality of unit processors to commonly execute any one of the program codes, or a policy for causing each of a plurality of program codes to be distributed and executed in the plurality of unit processors.

13. The operation method of the semiconductor apparatus according to claim 8, wherein the plurality of unit processors are grouped into a given number of processor parts, and wherein the operation policy includes a policy for causing each of the processor parts to execute a corresponding one of the program codes.

14. A stacked memory apparatus comprising:

a base die; and a plurality of core dies disposed over the base die and stacked through a plurality of through electrodes, wherein at least one of the plurality of core dies comprises a storage device, the storage device including a data area and a code area and storing program codes provided from a host device in the code area, and wherein the base die comprises:

a plurality of unit processors, each of the plurality of unit processors including an internal memory; and a boot controller configured to receive an operation policy, which includes one or more of a processor ID, a code ID, a code address, and an option number, from the host device and to control the plurality of unit processors based on the operation policy, and wherein the processor ID is an identifier for each of the plurality of unit processors, the code ID is an identifier for each of the program codes, the code address indicates a position of the code area where each of the program codes is stored, and the option number represents a specific combination of the processor ID, the code ID, and the code address, and wherein the boot controller is configured to receive the operation policy including only the option number when the operation policy is not changed, and receive the operation policy including the processor ID, the code ID, the code address, and the option number when the operation policy is changed, from the host device.

15. The stacked memory apparatus according to claim 14, further comprising an interface substrate over which the main control component and the base die are stacked.

16. The stacked memory apparatus according to claim 15, further comprising a package substrate over which the interface substrate is stacked.

17. The stacked memory apparatus according to claim 14, further comprising:

an interface substrate over which the boot controller and the base die are stacked; and a package substrate over which the interface substrate is stacked.

* * * * *